(12) United States Patent
Yu et al.

(10) Patent No.: US 10,824,233 B2
(45) Date of Patent: Nov. 3, 2020

(54) INTERACTION METHOD, INTERACTION APPARATUS, AND USER EQUIPMENT

(71) Applicant: BEIJING ZHIGU RUI TUO TECH CO., LTD., Beijing (CN)

(72) Inventors: Kuifei Yu, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 104 days.

(21) Appl. No.: 15/414,860

(22) Filed: Jan. 25, 2017

(65) Prior Publication Data

US 2017/0228088 A1    Aug. 10, 2017

(30) Foreign Application Priority Data

Feb. 4, 2016  (CN) .......................... 2016 1 0080566

(51) Int. Cl.
    *G06F 3/01* (2006.01)
(52) U.S. Cl.
    CPC .................................. *G06F 3/016* (2013.01)
(58) Field of Classification Search
    None
    See application file for complete search history.

(56) References Cited

U.S. PATENT DOCUMENTS

| 2005/0104866 A1 | 5/2005 | Inui |
| 2010/0064244 A1* | 3/2010 | Kilpatrick, II ........ G06F 1/1616 715/773 |
| 2011/0148797 A1 | 6/2011 | Huitema et al. |
| 2012/0038570 A1* | 2/2012 | Delaporte ............. G06F 1/1616 345/173 |
| 2013/0127918 A1 | 5/2013 | Kang et al. |

(Continued)

FOREIGN PATENT DOCUMENTS

| CN | 102057342 A | 5/2011 |
| CN | 103389865 A | 11/2013 |
| CN | 103946780 A | 7/2014 |

*Primary Examiner* — Matthew Yeung
(74) *Attorney, Agent, or Firm* — Sheppard Mullin Richter & Hampton LLP

(57) ABSTRACT

Embodiments of the present application disclose an interaction method, an interaction apparatus, and user equipment. The method comprises: determining shape related information of a deformable touch sensing feedback surface, where the shape related information corresponds to a first shape of the deformable touch sensing feedback surface after a folding deformation; determining multiple effective interaction areas on the deformable touch sensing feedback surface at least according to the shape related information, where the multiple effective interaction areas meet the following conditions: in nonadjacent positions on the deformable touch sensing feedback surface, and adjacent in a spatial position in the first shape; and using the multiple effective interaction areas as one interaction area at least according to a first relative position of the multiple effective interaction areas in the spatial position in the first shape to provide a touch sensing feedback interface to at least one interaction object. The technical solutions in the embodiments of the present application can bring new experience to a user according to a deformation property of a deformable device.

31 Claims, 17 Drawing Sheets

(56) References Cited

U.S. PATENT DOCUMENTS

| | | | |
|---|---|---|---|
| 2013/0300686 A1 | 11/2013 | Yoon et al. | |
| 2015/0091778 A1* | 4/2015 | Day | G06F 3/1446 345/1.3 |
| 2015/0301636 A1* | 10/2015 | Akimoto | G06F 3/044 345/173 |
| 2016/0246559 A1* | 8/2016 | Jung | G06F 3/1431 |
| 2016/0299539 A1* | 10/2016 | Jang | G06F 1/1681 |

* cited by examiner

INTERACTION METHOD, INTERACTION APPARATUS, AND USER EQUIPMENT

CROSS REFERENCE TO RELATED APPLICATION

The present application is based on and claims the benefit of priority to Chinese Application No. 201610080566.9, filed on Feb. 4, 2016, the entire contents of which are incorporated herein by reference.

TECHNICAL FIELD

The present application relates to the field of interaction technologies, and in particular, to an interaction method, an interaction apparatus, and user equipment.

BACKGROUND

With the development of technologies, deformable devices such as flexible devices become increasingly popular. Deformable devices have changeable shapes, and therefore bring users a lot of new user experience. For example, demands of users for wearable devices to meet different body curves, demands for devices to have increased sizes for using and decreased sizes for carrying, and the like are met more easily. When deformable interaction devices are used to perform interaction, different experience is also brought to users.

SUMMARY

A possible objective of embodiments of the present application is to provide an interaction solution based on a deformable touch sensing feedback surface.

According to a first aspect, a possible implementation solution of the present application provides an interaction method, comprising:

determining shape related information of a deformable touch sensing feedback surface, where the shape related information corresponds to a first shape of the deformable touch sensing feedback surface after a folding deformation;

determining multiple effective interaction areas on the deformable touch sensing feedback surface at least according to the shape related information, where the multiple effective interaction areas meet the following conditions: in nonadjacent positions on the deformable touch sensing feedback surface, and adjacent in a spatial position in the first shape; and using the multiple effective interaction areas as one interaction area at least according to a first relative position of the multiple effective interaction areas in the spatial position in the first shape to provide a touch sensing feedback interface to at least one interaction object.

According to a second aspect, a possible implementation solution of the present application provides an interaction apparatus, comprising:

an information determining module, configured to determine shape related information of a deformable touch sensing feedback surface, where the deformable touch sensing feedback surface is at least configured to perform information output, and the shape related information corresponds to a first shape of the deformable touch sensing feedback surface after a folding deformation;

an area determining module, configured to determine multiple effective interaction areas on the deformable touch sensing feedback surface at least according to the shape related information, where the multiple effective interaction areas meet the following conditions: in nonadjacent positions on the deformable touch sensing feedback surface, and adjacent in a spatial position in the first shape; and a touch sensing feedback interface providing module, configured to use the multiple effective interaction areas as one interaction area at least according to a first relative position of the multiple effective interaction areas in the spatial position in the first shape to provide a touch sensing feedback interface to at least one interaction object.

According to a third aspect, a possible implementation solution of the present application provides user equipment, where the user equipment comprises:

a memory, configured to store a program; and a processor, configured to execute the program stored in the memory, the program causes the processor to execute the following operations:

determining shape related information of a deformable touch sensing feedback surface, where the shape related information corresponds to a first shape of the deformable touch sensing feedback surface after a folding deformation;

determining multiple effective interaction areas on the deformable touch sensing feedback surface at least according to the shape related information, where the multiple effective interaction areas meet the following conditions: in nonadjacent positions on the deformable touch sensing feedback surface, and adjacent in a spatial position in the first shape; and using the multiple effective interaction areas as one interaction area at least according to a first relative position of the multiple effective interaction areas in the spatial position in the first shape to provide a touch sensing feedback interface to at least one interaction object.

In at least one implementation solution of the embodiments of the present application, after a deformation of a deformable touch sensing feedback surface occurs, multiple effective interaction areas adjacent in the spatial position are recombined to form one new interaction area used to provide a touch sensing feedback interface to an interaction object, thereby bringing new experience to a user by using a deformation property of a deformable device.

DETAILED DESCRIPTION

Figure 1:
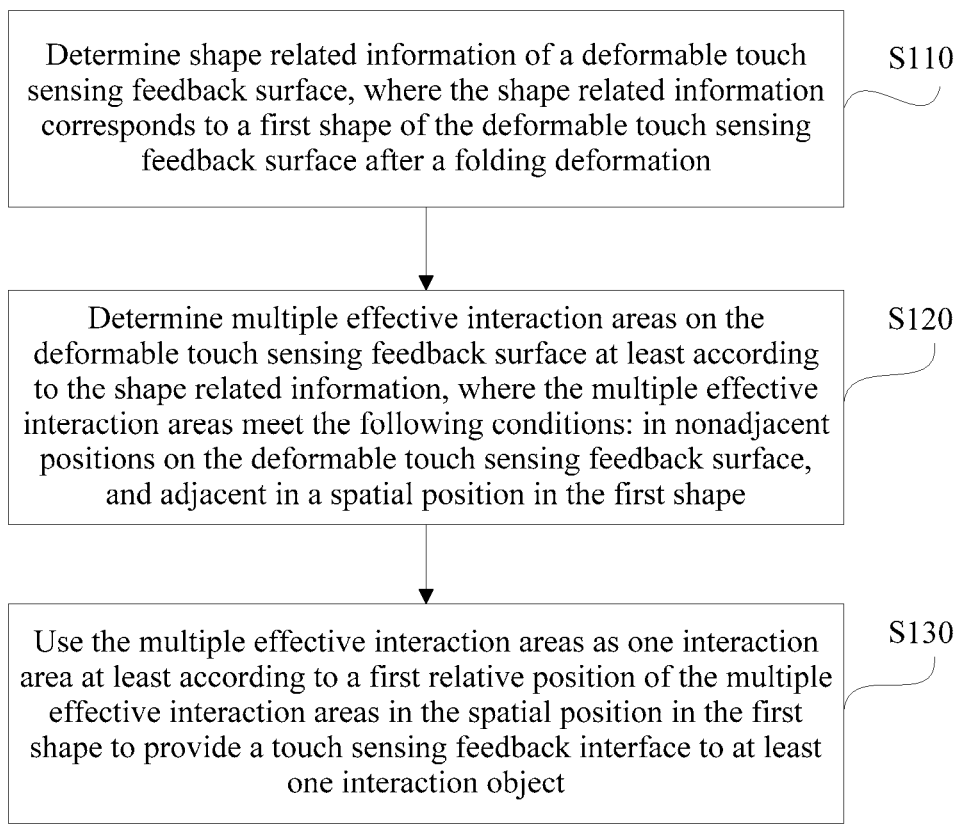
FIG. 1 is a flowchart of an interaction method according to an embodiment of the present application.

The specific implementing manners of the present application are further described below in detail with reference to the accompanying drawings (a same reference numeral in several drawings represents a same element) and embodiments. The embodiments below are used for describing the present application rather than to limit the scope of the present application.

A person skilled in the art may understand that, terms such as "first" and "second" in the present application are only used to distinguish different steps, devices or modules and the like, but do not represent any specific technical meanings, and do not denote a necessary logic order among the steps, devices or modules and the like.

The inventor of the present application finds that, because a deformable touch sensing feedback surface has a changeable shape, after a deformation occurs, for some effective interaction areas before the deformation, for example, areas that are covered or blocked after the deformation occurs, effective interaction may no longer be able to be performed after the deformation occurs. Meanwhile, some multiple interaction areas that are originally scattered may become multiple effective interaction areas adjacent in a spatial position after the deformation occurs, and effective use of the multiple effective interaction areas may cause a deformable device to bring more desirable user experience to a user.

In the following description of the present application:

An interaction object of the deformable touch sensing feedback surface may be a user, or may be an electronic device and the like.

An effective interaction area is an area where effective interaction may be performed with an interaction object. In a possible implementing manner, for example, it may be set that there is no obstacle within a set distance range on a side faced by the effective interaction area; and/or the effective interaction area faces a side where the interaction object is located, and the like. Alternatively, further, in another possible implementing manner, the effective interaction area comprises that: the interaction meets a set interaction condition, to cause interaction between the effective interaction area and the interaction object to achieve an expected interaction effect. For example, the interaction condition may comprise that: a deviation between the first interaction information before being output by using the effective interaction area and the second interaction information that is output and can be acquired by the interaction object is within a set deviation range.

A position of an interaction area on the deformable touch sensing feedback surface is: a position of a coordinate area corresponding to the area on a coordinate surface, where the deformable touch sensing feedback surface is used as the coordinate surface. Regardless of how the deformable touch sensing feedback surface is curved or folded, a coordinate area corresponding to the area does not change.

A spatial position of an area is a position of the area in a spatial coordinate system.

As shown in FIG. 1, an embodiment of the present application provides an interaction method, comprising:

S110: Determine shape related information of a deformable touch sensing feedback surface, where the shape related information corresponds to a first shape of the deformable touch sensing feedback surface after a folding deformation.

S120: Determine multiple effective interaction areas on the deformable touch sensing feedback surface at least according to the shape related information, where the multiple effective interaction areas meet the following conditions: in nonadjacent positions on the deformable touch sensing feedback surface, and adjacent in a spatial position in the first shape.

S130: Use the multiple effective interaction areas as one interaction area at least according to a first relative position of the multiple effective interaction areas in the spatial position in the first shape to provide a touch sensing feedback interface to at least one interaction object.

Figure 5A:
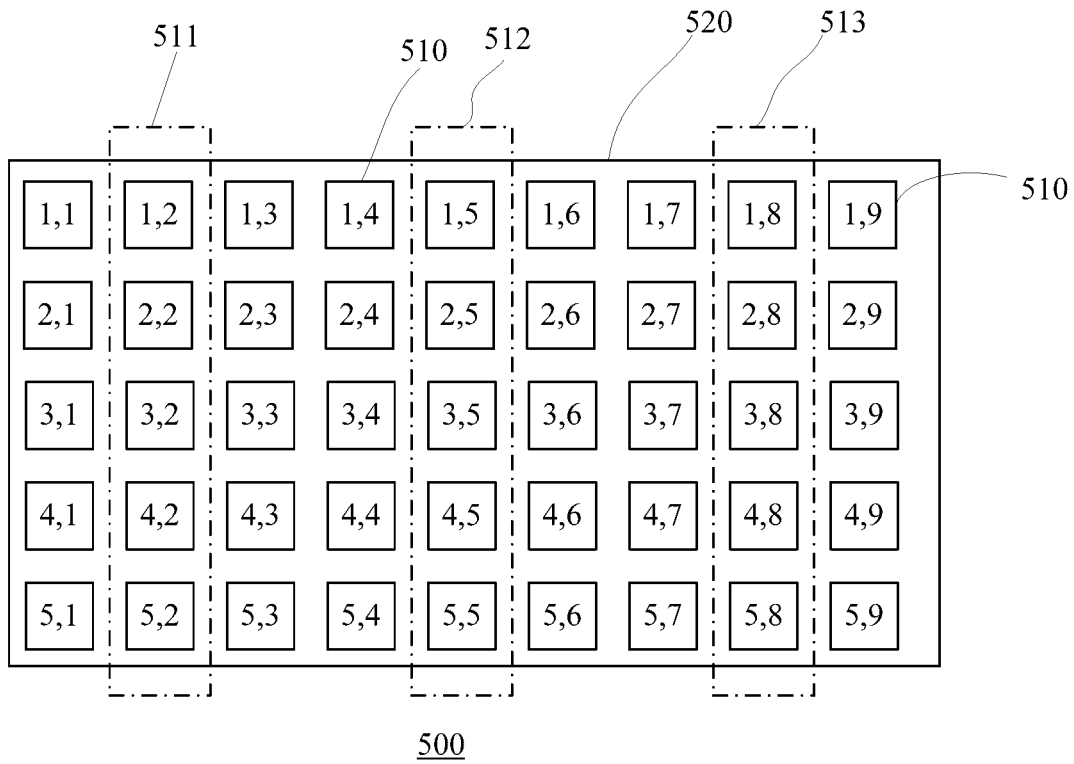
FIG. 5a to FIG. 5c are schematic diagrams of an application scenario of an interaction method according to an embodiment of the present application.

In a possible implementing manner, the deformable touch sensing feedback surface, for example, may comprise: a flexible substrate surface and multiple touch sensing feedback units that are distributed in an array on the flexible substrate surface and are correlated, for example, the touch sensing feedback array shown in FIG. 5a. In a possible implementing manner, the flexible substrate surface may be a flexible display screen, a flexible touch screen or a flexible display touch screen. In a possible implementing manner, the touch sensing feedback units are transparent touch sensing feedback units.

In some possible implementing manners, the multiple touch sensing feedback units may provide one or more of touch sensing feedbacks such as undulations, vibrations, texture, and temperature, thereby enriching interaction experience between a user and a smart device.

For example, the interaction apparatus provided in the present application is used as an execution subject in this embodiment to execute S110 to S130. Specifically, the interaction apparatus may be disposed in user equipment in a manner of software, hardware or a combination of software and hardware, or, the interaction apparatus may be the user equipment. The user equipment comprises but not limited to a mobile phone, a computer, a television, a wearable device or the like that has a deformable touch sensing feedback surface that allows a folding deformation.

In an implementing manner in this embodiment of the present application, after a deformation of a deformable touch sensing feedback surface occurs, multiple effective interaction areas adjacent in the spatial position are recombined to form one new interaction area used to provide a touch sensing feedback interface to an interaction object, thereby bringing new experience to a user by using a deformation property of a deformable device.

The method in this embodiment of the present application is further described by using the following implementing manners.

Figure 2A:
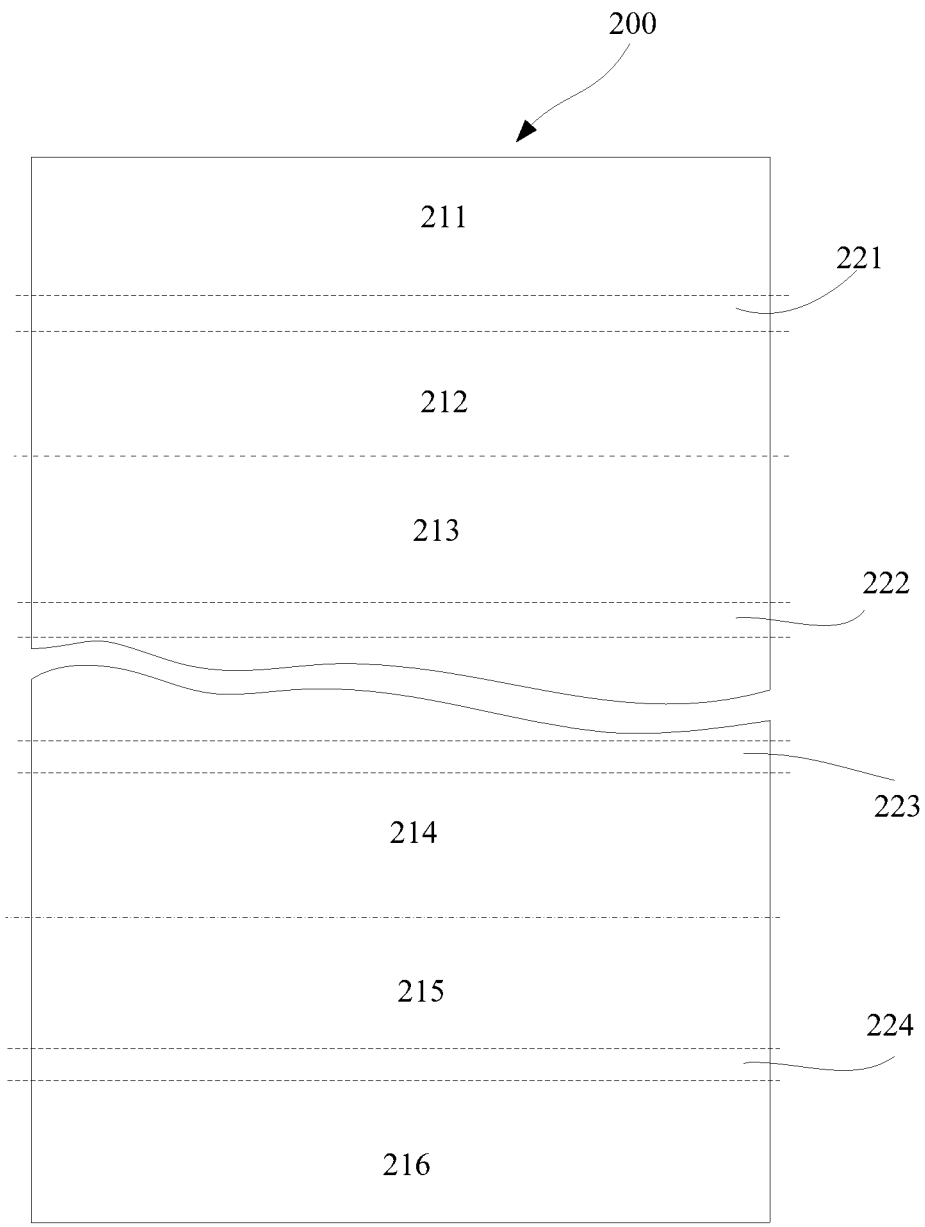
FIG. 2a to FIG. 2e are schematic diagrams of an application scenario of an interaction method according to an embodiment of the present application.
Figure 2B:
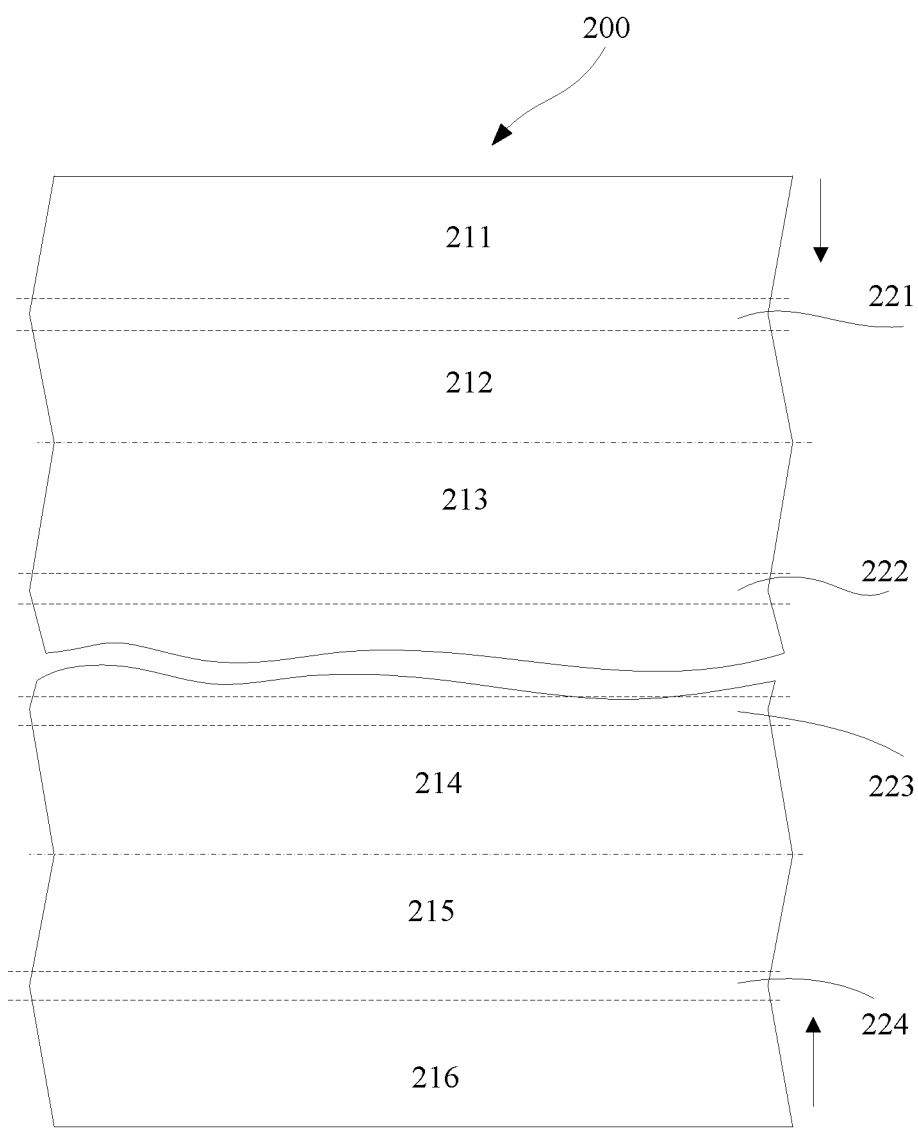

In a possible implementing manner, a shape of a deformable touch sensing feedback surface 200 being unfolded is a rectangle shown in FIG. 2a. During a folding deformation, the rectangle shown in FIG. 2a turns into a wavy state shown in FIG. 2b and eventually becomes a folded state shown in FIG. 2c. FIG. 2d is a right diagram of FIG. 2c.

As can be seen from FIG. 2a to FIG. 2d, after a folding deformation of a deformable touch sensing feedback surface 200 occurs, a part of the interaction area (for example, wing-surface areas 212 to 215) is folded and blocked and is no longer an effective interaction area. In some possible implementing manners, another part of interaction area (for example, wing-surface areas 211 and 216) may also be no longer an effective interaction area because of a facing-direction problem (for example, an interaction direction D of an interaction object to the deformable touch sensing feedback surface 200 is a direction right opposite the deformable touch sensing feedback surface 200 shown in FIG. 2a to FIG. 2c).

In the implementing manner shown in FIG. 2a to FIG. 2d, only several remaining folding areas 221 to 225 where several outwardly-bending end surfaces are located are effective interaction areas that still can be used to perform effective interaction with an interaction object.

In this embodiment of the present application, a folding area is an area corresponding to a bending end that connects two opposite wing surfaces in a creased structure. For example, a folding area 221 is an area corresponding to a bending end that connects two opposite wing surface areas 211 and 212 after folding.

Conventionally, after the foregoing folding deformation is performed on the deformable touch sensing feedback surface 200, for remaining effective interaction areas, a possible manner is: an interaction function of the entire deformable touch sensing feedback surface 200 is turned off, and interaction is no longer performed with the interaction object. For example, all touch sensing feedback units are turned off and no longer provide a touch sensing feedback. Another possible manner is: The remaining effective interaction areas are still used as a part of the touch sensing feedback interface before the deformation to perform incomplete interaction with the interaction object. For example, each touch sensing feedback unit performs touch sensing feedback output by using corresponding touch sensing feedback information before the deformation.

The inventor of the present application finds that, in some scenarios, after the folding deformation of the deformable touch sensing feedback surface occurs, multiple effective interaction areas adjacent in a spatial position may be formed. Although an area of one effective interaction area may be relatively small and can hardly be used as a separate touch sensing feedback interface to perform interaction with an interaction object, the multiple effective interaction areas may be recombined into one relatively large interaction area and may be reused.

In this embodiment of the present application, shape related information corresponding to the first shape of the deformable touch sensing feedback surface after a folding deformation is determined, and the multiple effective interaction areas are then determined according to the shape related information.

In a possible implementing manner, optionally, the shape related information may comprise:

the first shape information of the first shape.

Figure 2C:
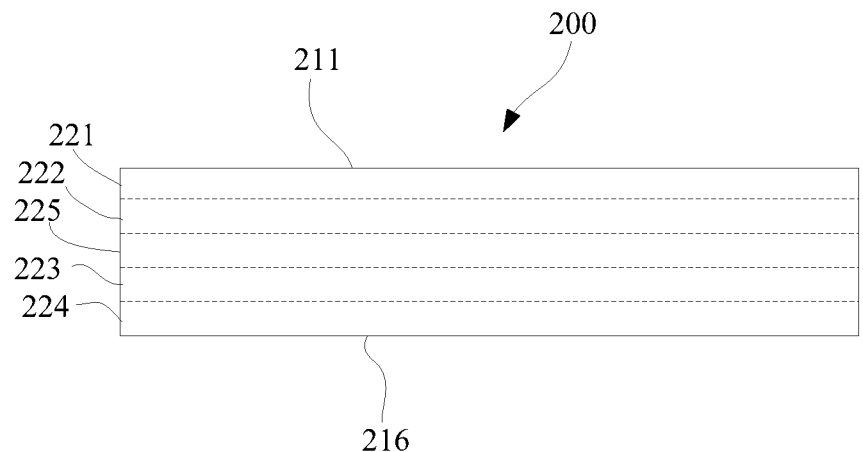
Figure 2D:
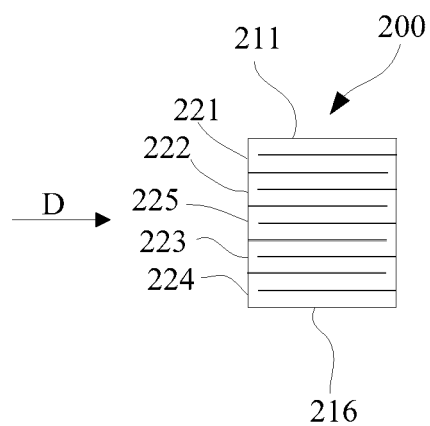

For example, in the implementing manner shown in FIG. 2a to FIG. 2d, shape information of the deformable touch sensing feedback surface after the folding shown in FIG. 2c and FIG. 2d may be acquired as the shape related information.

In another possible implementing manner, optionally, the shape related information may also be not the first shape information, and instead may indirectly obtain other information of the first shape information. For example, the shape related information may comprise:

second shape information of a second shape of the deformable touch sensing feedback surface before the folding deformation, and deformation information corresponding to the folding deformation.

Here, the deformation information may be a shape change parameter, or may be another parameter related to a deformation. For example, when the deformable touch sensing feedback surface is a thermally-induced deformation material, the deformation information may comprise temperature change information and the like of areas. Alternatively, for example, the deformation information may further be displacement information, of areas on the deformable touch sensing feedback surface, acquired by using an acceleration sensing array, a gyroscope array, and the like corresponding to the deformable touch sensing feedback surface.

A person skilled in the art may know that the first shape may also be determined according to the second shape information and the deformation information.

In a possible implementing manner, the deformable touch sensing feedback surface has a controllable deformation, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in S110, the shape related information may be determined at least according to a deformation control instruction, where the deformation control instruction is used to control the folding deformation of the deformable touch sensing feedback surface.

For example, in the implementing manner as shown in FIG. 2a to FIG. 2d, a first deformation control instruction may be obtained in response to an operation that a user clicks a "Fold" button. The first deformation control instruction corresponds to the shape shown in FIG. 2c. In this case, regardless of a shape of the deformable touch sensing feedback surface before a folding deformation, once the first deformation control instruction is acquired, the deformable touch sensing feedback surface is automatically controlled to deform into the shape shown in FIG. 2c.

In other possible implementing manners, for example, when the deformation control instruction corresponds to deformation information, in S110, the second shape information further requires to be acquired to obtain the shape related information.

In addition to the foregoing the deformation control instruction, a deformation sensor configured to acquire corresponding deformation sensing information according to a deformation of the deformable touch sensing feedback surface may be further used to obtain the deformation related information. The deformation sensor, for example, may generate a corresponding voltage or current parameter value according to a deformation of the deformable touch sensing feedback surface, where the deformation sensing information is the voltage or current parameter value.

In a possible implementing manner, after the folding deformation of the deformable touch sensing feedback surface occurs, the shape related information may be determined at least according to the deformation sensing information.

In the method in this embodiment of the present application, after the shape related information is acquired, the multiple effective interaction areas may be determined at least according to the shape related information.

In this embodiment of the present application, the multiple effective interaction areas meet the following conditions: in nonadjacent positions on the deformable touch sensing feedback surface, and adjacent in a spatial position in the first shape.

Here, the multiple effective interaction areas are adjacent in a spatial position in the first shape, and therefore can be recombined into one interaction area.

In this embodiment of the present application, if two effective interaction areas are in adjacent positions on the deformable touch sensing feedback surface and are adjacent in the spatial position in the first shape, the two effective interaction areas may be seen as one effective interaction area.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0. For example, in the implementing manner shown in FIG. 2c and FIG. 2d, two adjacent effective interaction areas adjoin.

Figure 2E:
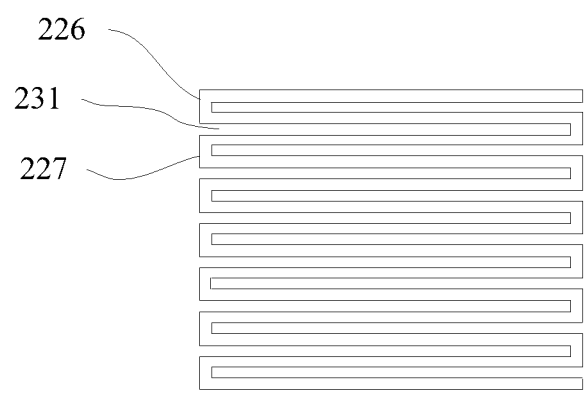

Alternatively, in another possible implementing manner, that two effective interaction areas are adjacent in a spatial position may be that a distance between nearby edges of the two interaction areas is less than a set value. For example, the deformable touch sensing feedback surface shown in FIG. 2a may also be folded and deformed into the shape shown in FIG. 2e. A gap area 231 further exists between the two adjacent effective interaction areas 226, 227. In this implementing manner, when a width (a width in a vertical direction in FIG. 2e) of the gap area 231 is less than set value, it may be considered that the two effective interaction areas 226, 227 are adjacent.

In some possible implementing manners, the set value may be determined according to influence of the distance on interaction of the interaction object. For example, when the distance between two adjacent effective interaction areas is too large for a user to use the two effective interaction areas as one area to acquire touch sensing feedback, the distance between the two effective interaction areas is greater than the set value.

In a possible implementing manner, in addition to the shape related information, other information may further need to be combined to obtain the multiple effective interaction areas.

In a possible implementing manner, S120 may comprise:

determining, according to the shape related information, multiple folding areas where multiple outwardly-bending end surfaces are located, where the multiple outwardly-bending end surfaces are adjacent in the spatial position on the deformable touch sensing feedback surface in the first shape; and determining the multiple effective interaction areas at least according to the multiple folding areas.

In a possible implementing manner, the multiple effective interaction areas are the multiple folding areas.

As shown in FIG. 2a and FIG. 2c, positions of each two of the multiple folding areas 221 to 225 on the deformable touch sensing feedback surface are separated by at least another interaction area and are not adjacent to each other. In a deformed spatial position, the multiple folding areas 221 to 225 are adjacent. Therefore, in the implementing manner shown in FIG. 2a to FIG. 2d, it may be determined that the multiple folding areas 221 to 225 are the multiple effective interaction areas.

In some possible implementing manners, in addition to the foregoing the multiple folding areas, the multiple effective interaction areas may further comprise another area that is adjacent to or is connected to the multiple folding areas in the spatial position after the folding deformation occurs.

For example, in a possible implementing manner, as shown in FIG. 2a to FIG. 2d, the folding area 221 and the wing-surface area 211 that are connected may be used as one effective interaction area; and the folding area 224 and the wing-surface area 216 that are connected may be used as one effective interaction area.

Figure 3A:
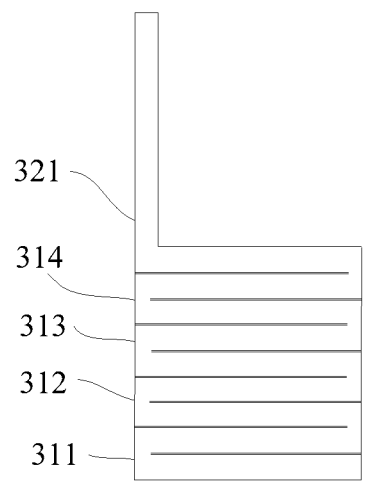
FIG. 3a and FIG. 3b are schematic diagrams of two shapes of a deformable touch sensing feedback surface being folded in an interaction method according to an embodiment of the present application.

Further, for example, in the implementing manner shown in FIG. 3a, in a case in which an interaction direction is considered, in addition to four folding areas 311 to 314, an unfolded area 321 (an area where a wing surface is located in a creased structure) is also an effective interaction area facing the interaction object, and is adjacent to the four folding areas 311 to 314 in the spatial position. Therefore, the multiple effective interaction areas further comprise the unfolded area 321.

Therefore, the determining the multiple effective interaction areas at least according to the multiple folding areas comprises:

determining the multiple effective interaction areas at least according to the multiple folding areas and the first shape.

Figure 3B:
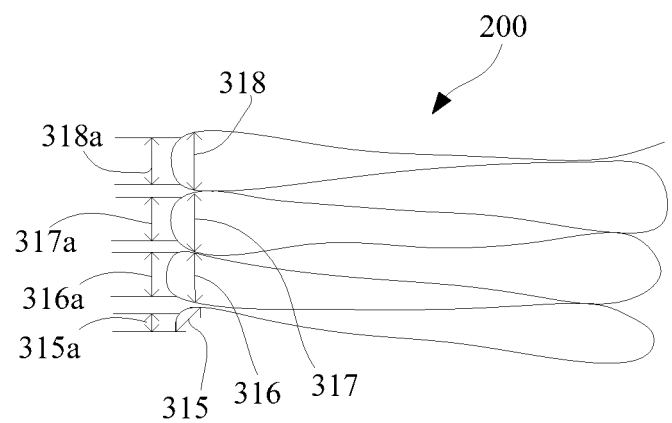

In a possible implementing manner, a characteristic of interaction further needs to be considered to determine whether the multiple folding areas are all effective interaction areas. For example, in a possible implementing manner, a first shape of the deformable touch sensing feedback surface 200 shown in FIG. 2a after a folding deformation may also be shown in FIG. 3b, and four folding areas 315 to 318 may be determined according to the first shape. However, in a process of interaction with an interaction object, the four folding areas 315 to 318 are not necessarily all effective interaction areas. For example, parts close to each other of two adjacent folding areas may be beyond the reach of an interaction object, and therefore, only a part of each folding area is an effective interaction area. For example, as shown in FIG. 3b, according to the four folding areas 315 to 318 and a characteristic (for example, usually a characteristic such as a shape of a finger of a user) of an interaction object, four effective interaction areas 315a to 318a may be determined.

In this embodiment of the present application, after the multiple effective interaction areas are determined, the multiple effective interaction areas may be used as one new interaction area to provide a touch sensing feedback interface to an interaction object.

In a possible implementing manner, the using the multiple effective interaction areas as one interaction area at least according to a first relative position may be: splicing the multiple effective interaction areas to the interaction area according to the first relative position.

In a possible implementing manner, the deformable touch sensing feedback surface implements interaction with an interaction object by using multiple comprised interaction units, and each effective interaction area corresponds to multiple interaction units. Here, an interaction unit may be a touch sensing feedback unit.

In a possible implementing manner, the splicing may be performing readdressing on addresses of interaction units in the multiple effective interaction areas, to obtain a new address that matches the interaction area.

For example, it is assumed that in the implementing manner shown in FIG. 2a, before the folding deformation, first addresses (x,y) of interaction units comprised in the folding area 221 and the folding area 222 (where x is a first row address, y is a first column address, and in a possible implementing manner, the first address may also be used as coordinates of a position of an interaction unit on the deformable touch sensing feedback surface) are shown in Table 1 and Table 2:

TABLE 1

First addresses of 30 interaction units comprised in the folding area 221

| | | | | | | | | | |
|---|---|---|---|---|---|---|---|---|---|
| 13, 1 | 13, 2 | 13, 3 | 13, 4 | 13, 5 | 13, 6 | 13, 7 | 13, 8 | 13, 9 | 13, 10 |
| 14, 1 | 14, 2 | 14, 3 | 14, 4 | 14, 5 | 14, 6 | 14, 7 | 14, 8 | 14, 9 | 14, 10 |
| 15, 1 | 15, 2 | 15, 3 | 15, 4 | 15, 5 | 15, 6 | 15, 7 | 15, 8 | 15, 9 | 15, 10 |

TABLE 2

First addresses of 30 interaction units comprised in the folding area 222

| | | | | | | | | | |
|---|---|---|---|---|---|---|---|---|---|
| 40, 1 | 40, 2 | 40, 3 | 40, 4 | 40, 5 | 40, 6 | 40, 7 | 40, 8 | 40, 9 | 40, 10 |
| 41, 1 | 41, 2 | 41, 3 | 41, 4 | 41, 5 | 41, 6 | 41, 7 | 41, 8 | 41, 9 | 41, 10 |
| 42, 1 | 42, 2 | 42, 3 | 42, 4 | 42, 5 | 42, 6 | 42, 7 | 42, 8 | 42, 9 | 42, 10 |

In this implementing manner, if readdressing is performed on addresses of the interaction units in the two folding areas 221, 222 according to relative positions in space of the two folding areas 221, 222 in the first shape after the folding deformation shown in FIG. 2c, second addresses (x1,y1) of the interaction units as shown in Table 3 and Table 4 may be obtained:

TABLE 3

Second addresses of the 30 interaction units comprised in the folding area 221

| | | | | | | | | | |
|---|---|---|---|---|---|---|---|---|---|
| 1, 1 | 1, 2 | 1, 3 | 1, 4 | 1, 5 | 1, 6 | 1, 7 | 1, 8 | 1, 9 | 1, 10 |
| 2, 1 | 2, 2 | 2, 3 | 2, 4 | 2, 5 | 2, 6 | 2, 7 | 2, 8 | 2, 9 | 2, 10 |
| 3, 1 | 3, 2 | 3, 3 | 3, 4 | 3, 5 | 3, 6 | 3, 7 | 3, 8 | 3, 9 | 3, 10 |

TABLE 4

Second addresses of the 30 interaction units comprised in the folding area 222

| | | | | | | | | | |
|---|---|---|---|---|---|---|---|---|---|
| 4, 1 | 4, 2 | 4, 3 | 4, 4 | 4, 5 | 4, 6 | 4, 7 | 4, 8 | 4, 9 | 4, 10 |
| 5, 1 | 5, 2 | 5, 3 | 5, 4 | 5, 5 | 5, 6 | 5, 7 | 5, 8 | 5, 9 | 5, 10 |
| 6, 1 | 6, 2 | 6, 3 | 6, 4 | 6, 5 | 6, 6 | 6, 7 | 6, 8 | 6, 9 | 6, 10 |

It may be seen that, after readdressing is performed on the addresses of the interaction units in the two folding areas 221, 222, second addresses of multiple interaction units respectively comprised in the two adjacent folding areas 221, 222 after the folding deformation are also adjacent and consecutive.

In another possible implementing manner, in the splicing, readdressing may also be not performed on the addresses of the interaction units in the multiple effective interaction areas, that is, the addresses of the interaction units are kept unchanged, but correlations between the addresses are changed.

For example, in a scenario in which the interaction units are scanned during interaction with an interaction object, the first address (15,10) of the last interaction unit of the folding area 221 and the first address (40,1) of the first interaction unit of the folding area 222 are correlated, to cause that during interaction of interaction information with an interaction object, after the last interaction unit of the folding area 221 is scanned, the first interaction unit of the folding area 222 is scanned next, and another area between the two folding areas 221, 222 is no longer scanned.

In still another possible implementing manner, the splicing may also be virtual splicing, and the interaction area is a virtual interaction area, that is, according to the first relative position, the multiple effective interaction areas are virtually spliced and mapped onto the virtual interaction area.

In a possible implementing manner, after the interaction area is determined through splicing, S130 may further comprise:

determining touch sensing feedback information matching the interaction area; and mapping the touch sensing feedback information from the interaction area to the multiple effective interaction areas according to the first relative position.

In a possible implementing manner, the determining touch sensing feedback information matching the interaction area comprises: determining touch sensing feedback information at least matching a shape of the interaction area.

For example, in a scenario in which the interaction area on the whole needs to provide a low-temperature touch sensing feedback to a user, the touch sensing feedback information is determined according to a shape of the interaction area, to cause that when presentation is performed according to the touch sensing feedback information, the interaction area on the whole provides the low-temperature touch sensing feedback to the user.

A shape of the interaction area, for example, may comprise: a size and an outer shape (for example, a rectangle and a circle) of the interaction area.

In a possible implementing manner, a touch sensing feedback provided by the interaction area corresponds to a display image. For example, the deformable touch sensing feedback surface is an interaction surface that integrates display and a touch sensing feedback (for example, a substrate of the touch sensing feedback array is a flexible display surface); or the deformable touch sensing feedback surface is a touch control pad corresponding to a display screen. In such a scenario, the touch sensing feedback information matching the interaction area may be: touch sensing feedback information matching the display image.

For example, a display image comprises options: "Yes" and "No". In this implementing manner, touch sensing feedback information is determined, to cause that on the interaction area, an area corresponding to the option "Yes" is a touch sensing feedback of a convex shape, and an area corresponding to the option "No" is a touch sensing feedback of a concave shape.

Alternatively, an object, that is, "hot coffee" and "iced water", is displayed on a display image. In this implementing manner, touch sensing feedback information may be determined, to cause that an area corresponding to the object "hot coffee" is a touch sensing feedback of a high temperature, and an area corresponding to the object "iced water" is a touch sensing feedback of a low-temperature.

In a possible implementing manner, optionally, the determining touch sensing feedback information matching the interaction area may further comprise:

in response to a touch operation at the interaction area, determining touch sensing feedback information at least matching the touch operation.

In this implementing manner, presentation of a touch sensing feedback in an area that is not touched by a user consumes energy and at the same time brings no desirable experience to the user, and therefore, touch feedback information may be determined according to the touch operation, to cause that a touch feedback is presented in only an area that is touched by the user or an area that has a high possibility of being touched.

Here, the touch operation may be determined by using a touch sensor or a proximity sensor.

In a possible implementing manner, according to both a display image corresponding to the interaction area and the touch operation, touch sensing feedback information corresponding to the display image and the touch operation may be determined.

For example, a display image corresponding to the interaction area comprises the object "hot coffee" and the object "iced water", and, it is determined according to the touch operation that the user has touched or is about to touch an area corresponding to the object "iced water" on the interaction area, so that touch sensing feedback information is determined, to cause that the area corresponding to the object "iced water" is a touch sensing feedback of a low-temperature, while another area on the interaction area does not have a special touch sensing feedback.

A person skilled in the art may know that a manner of determining touch sensing feedback information matching the interaction area may further be another manner, and the manners are no longer listed one by one herein.

In a possible implementing manner, the mapping the touch sensing feedback information from the interaction area to the multiple effective interaction areas according to the first relative position comprises:

processing the touch sensing feedback information according to the first relative position, to obtain multiple pieces of touch sensing feedback sub-information respectively corresponding to the multiple effective interaction areas.

In a possible implementing manner, optionally, S130 may further comprise: presenting the multiple touch sensing feedback sub-information respectively by using the multiple effective interaction areas.

Figure 4A:
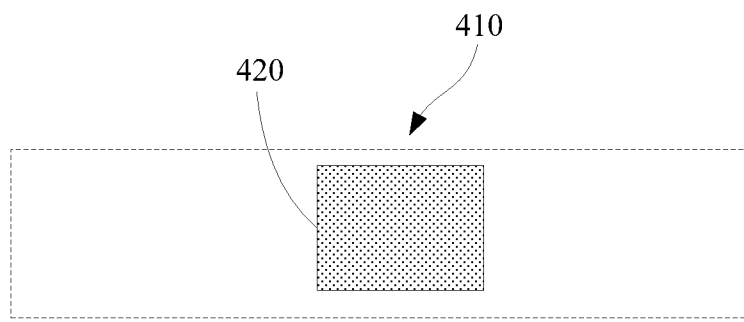
FIG. 4a to FIG. 4c are schematic diagrams of an application scenario of an interaction method according to an embodiment of the present application.
Figure 4B:
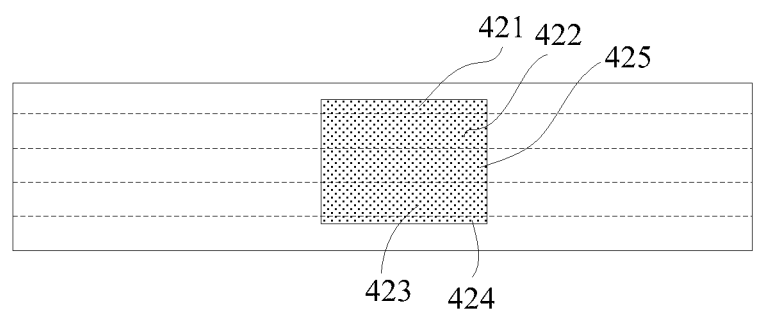
Figure 4C:
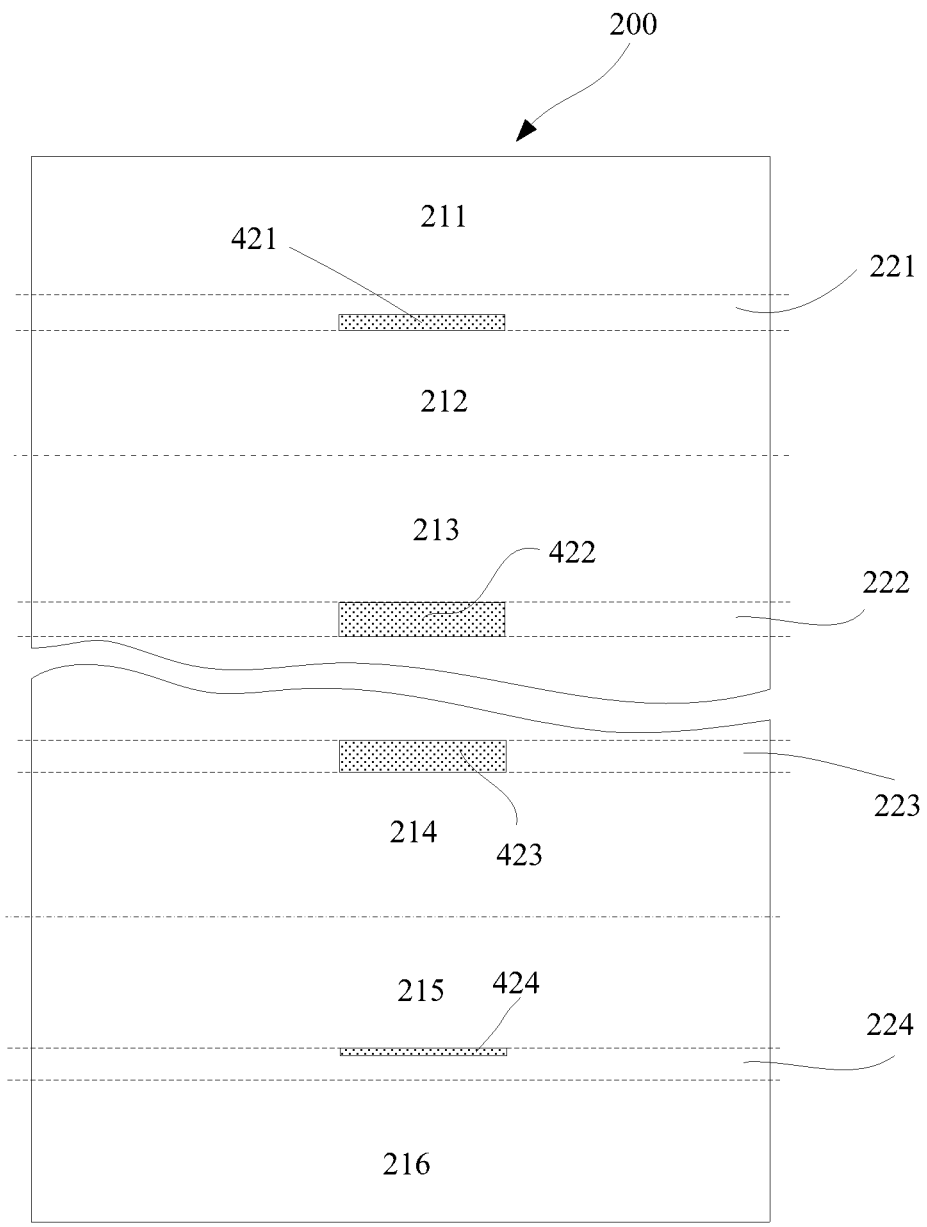

As shown in FIG. 4a to FIG. 4c, in a possible implementing manner, a deformable touch sensing surface 200 is the shape shown in FIG. 2c. A shape of an interaction area 410 obtained after the multiple effective interaction areas 221 to 225 are spliced is a rectangle shown in FIG. 4a. Touch sensing information matching the interaction area 410 is determined according to the interaction area 410. As shown in FIG. 4a and FIG. 4b, the touch sensing information corresponds to a touch sensing feedback of a grainy texture of a rectangular touch sensing feedback area 420.

The processing the touch sensing information according to the first relative position, for example, may be: performing segmentation processing on the rectangular touch sensing feedback area 420 according to the first relative position, to obtain multiple touch sensing feedback sub-areas 421 to 425 corresponding to the multiple effective interaction areas. The multiple touch sensing feedback sub-areas 421 to 425 all correspond to a touch sensing feedback of a grainy texture.

Positions of the multiple touch sensing feedback areas 421 to 425 on the deformable touch sensing feedback surface 200 are shown in FIG. 4c (where the touch sensing feedback sub-area 425 is not shown in FIG. 4c).

It may be seen that, an interaction effect between the interaction object and the multiple touch sensing feedback sub-areas 421 to 425 after the multiple effective interaction areas 221 to 225 are spliced is basically the same as an interaction effect of the interaction object by using the rectangular touch sensing feedback area 420 on the interaction area 410.

As shown in FIG. 4c, in a possible implementing manner, on the deformable touch sensing surface, an interaction area other than the multiple effective interaction areas may no longer present a touch feedback, thereby reducing energy consumption of the deformable touch sensing surface.

Figure 5B:
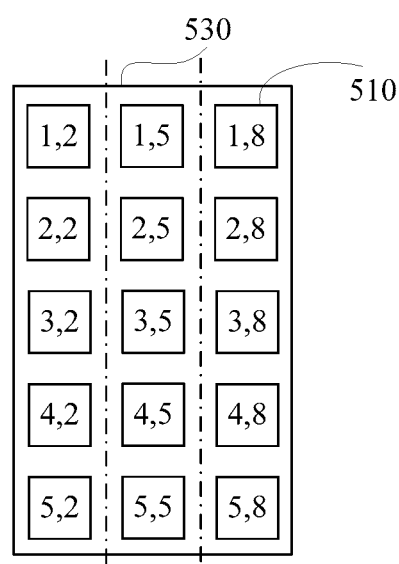
Figure 5C:
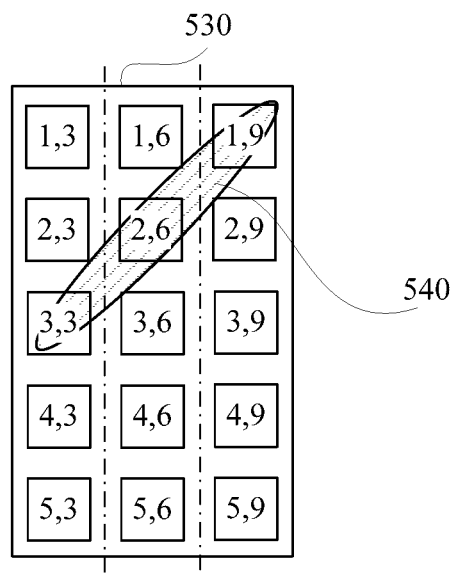

The present application is further described by using the implementing manner shown in FIG. 5a to FIG. 5c:

FIG. 5a shows a distribution of multiple touch sensing feedback units 510 of a deformable touch sensing feedback surface 500 on a flexible substrate 520, where the multiple touch sensing feedback units 510 are in a 5*9 array.

After a folding deformation, for example, areas where the first, the third, the fourth, the sixth, the seventh, and the ninth columns of touch sensing feedback units are covered or face different directions. Therefore, the areas where the six columns of touch sensing feedback units are located are no longer effective interaction areas. In this implementing manner, during touch sensing feedback output, the six columns of touch sensing feedback units may not need to be driven, so as to forbid working of the six columns of touch sensing feedback units, so that power consumption is reduced. Areas where the second, the fifth, and the eighth columns of touch sensing feedback units are located are three folding areas 511 to 513 of a shape after the folding deformation, so as to form three effective interaction areas after the folding deformation. Positions and a distribution of the touch sensing feedback units 510 on the three effective interaction areas after the folding deformation are shown in FIG. 5b. It may be seen that, positions of the three effective interaction areas on the deformable touch sensing feedback surface 500 are not adjacent, and are adjacent in a spatial position after a current time of folding deformation, so as to form a new interaction area 530.

As shown in FIG. 5c, after touch sensing feedback information corresponding to the interaction area 530 is determined, three touch sensing feedback units 510 in the first row and the ninth column, the second row and the sixth column, and the third row and the third column on the interaction area 530 are driven (for example, driven by using multiple weight factors), to cause a touch sensing feedback pattern 540 (for example, a protrusion) corresponding to the touch sensing feedback information to be presented to a user.

A person skilled in the art may understand that, in the foregoing method of specific implementing manners of the present application, sequence numbers of steps do not mean an order of executing the steps, where the order of executing the steps should be determined by the functions and internal logic of the steps, and should not constitute any limitation on implementation processes of the specific implementing manners of the present application.

Figure 6:
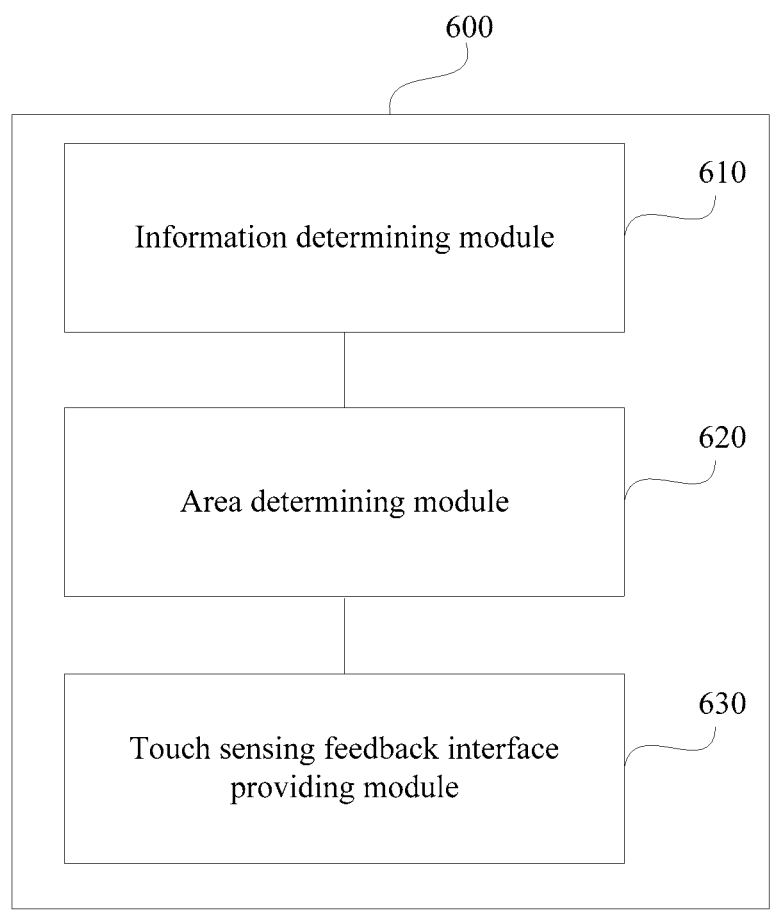
FIG. 6 is a schematic structural block diagram of an interaction apparatus according to an embodiment of the present application.

As shown in FIG. 6, a possible implementing manner of an embodiment of the present application provides an interaction apparatus 600, comprising:

an information determining module 610, configured to determine shape related information of a deformable touch sensing feedback surface, where the shape related information corresponds to a first shape of the deformable touch sensing feedback surface after a folding deformation;

an area determining module 620, configured to determine multiple effective interaction areas on the deformable touch sensing feedback surface at least according to the shape related information, where the multiple effective interaction areas meet the following conditions: in nonadjacent positions on the deformable touch sensing feedback surface, and adjacent in a spatial position in the first shape; and a touch sensing feedback interface providing module 630, configured to use the multiple effective interaction areas as one interaction area at least according to a first relative position of the multiple effective interaction areas in the spatial position in the first shape to provide a touch sensing feedback interface to at least one interaction object.

In a possible implementing manner, the deformable touch sensing feedback surface, for example, may comprise: a flexible substrate surface and multiple touch sensing feedback units that are distributed in an array on the flexible substrate surface and are correlated, for example, the touch sensing feedback array shown in FIG. 5a. In a possible implementing manner, the flexible substrate surface may be a flexible display screen, a flexible touch screen or a flexible display touch screen. In a possible implementing manner, the touch sensing feedback units are transparent touch sensing feedback units.

In some possible implementing manners, the multiple touch sensing feedback units may provide one or more of touch sensing feedbacks such as undulations, vibrations, texture, and temperature, thereby enriching interaction experience between a user and a smart device.

In an implementing manner in this embodiment of the present application, after a deformation of a deformable touch sensing feedback surface occurs, multiple effective interaction areas adjacent in the spatial position are recombined to form one new interaction area used to provide a touch sensing feedback interface to an interaction object, thereby bringing new experience to a user by using a deformation property of a deformable device.

The modules and units in this embodiment of the present application are further described by using the following implementing manners.

In a possible implementing manner, optionally, the shape related information may comprise:

the first shape information of the first shape.

In another possible implementing manner, optionally, the shape related information may also be not the first shape information, and instead may indirectly obtain other information of the first shape information. For example, the shape related information comprises:

second shape information of a second shape of the deformable touch sensing feedback surface before the folding deformation, and deformation information corresponding to the folding deformation.

Here, the deformation information may be a shape change parameter, or may be another parameter related to a deformation. For example, when the deformable touch sensing feedback surface is a thermally-induced deformation material, the deformation information may comprise temperature change information and the like of areas. Alternatively, for example, the deformation information may further be displacement information, of areas on the deformable touch sensing feedback surface, acquired by using an acceleration sensing array, a gyroscope array, and the like corresponding to the deformable touch sensing feedback surface.

A person skilled in the art may know that the first shape may also be determined according to the second shape information and the deformation information.

Figure 7A:
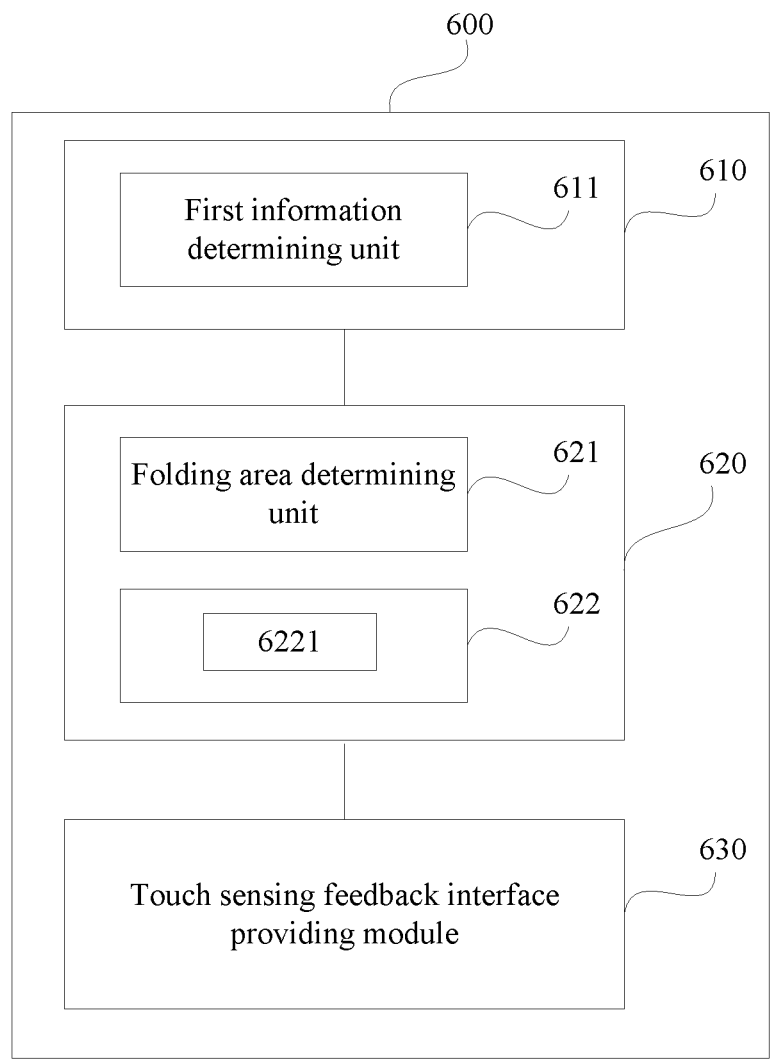
FIG. 7a to FIG. 7g are schematic structural block diagrams of seven interaction apparatuses according to an embodiment of the present application.

In a possible implementing manner, the deformable touch sensing feedback surface is an interaction surface whose deformation is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in a possible implementing manner, as shown in FIG. 7a, the information determining module 610 comprises:

a first information determining unit 611, configured to determine the shape related information at least according to a deformation control instruction, where the deformation control instruction is used to control the folding deformation of the deformable touch sensing feedback surface.

In a possible implementing manner, the first information determining unit 611 may, for example, acquire a correspondence between at least one deformation control instruction and at least one piece of deformation related information from a storage module according to the deformation control instruction, where the storage module stores the correspondence, and then obtain deformation related information corresponding to the deformation control instruction.

Figure 7B:
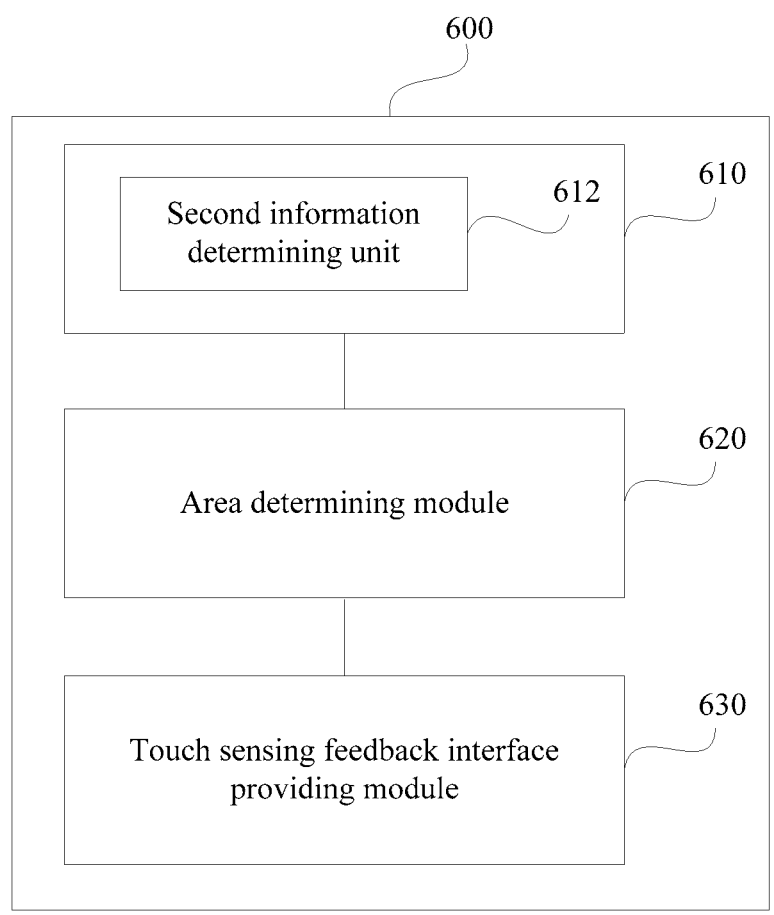

In addition to the foregoing the deformation control instruction, a deformation sensor configured to acquire corresponding deformation sensing information according to a deformation of the deformable touch sensing feedback surface may be further used to obtain the deformation related information. The deformation sensor, for example, may generate a corresponding voltage or current parameter value according to a deformation of the deformable touch sensing feedback surface, where the deformation sensing information is the voltage or current parameter value. Therefore, in a possible implementing manner, as shown in FIG. 7b, the information determining module 610 may comprise:

a second information determining unit 612, configured to determine the shape related information at least according to deformation sensing information for the deformable touch sensing feedback surface.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0.

Alternatively, in another possible implementing manner, that two effective interaction areas are adjacent in a spatial position may be that a distance between nearby edges of the two interaction areas is less than a set value.

In some possible implementing manners, the set value may be determined according to influence of the distance on interaction of the interaction object. For example, the distance between two adjacent effective interaction areas is too large for a user to use the two effective interaction areas as one area to acquire a touch sensing feedback, the distance between the two effective interaction areas is greater than the set value.

In a possible implementing manner, in addition to the shape related information, other information may further need to be combined to obtain the multiple effective interaction areas.

In a possible implementing manner, as shown in FIG. 7a, the area determining module 620 comprises:

a folding area determining unit 621, configured to determine, according to the shape related information, multiple folding areas where multiple outwardly-bending end surfaces are located, where the multiple outwardly-bending end surfaces are adjacent in the spatial position on the deformable touch sensing feedback surface in the first shape; and an area determining unit 622, configured to determine the multiple effective interaction areas at least according to the multiple folding areas.

In a possible implementing manner, the multiple effective interaction areas are the multiple folding areas. Therefore, in this implementing manner, as shown in FIG. 7a, the area determining unit 622 comprises:

a first determining subunit 6221, configured to determine that the multiple folding areas are the multiple effective interaction areas.

Figure 7C:
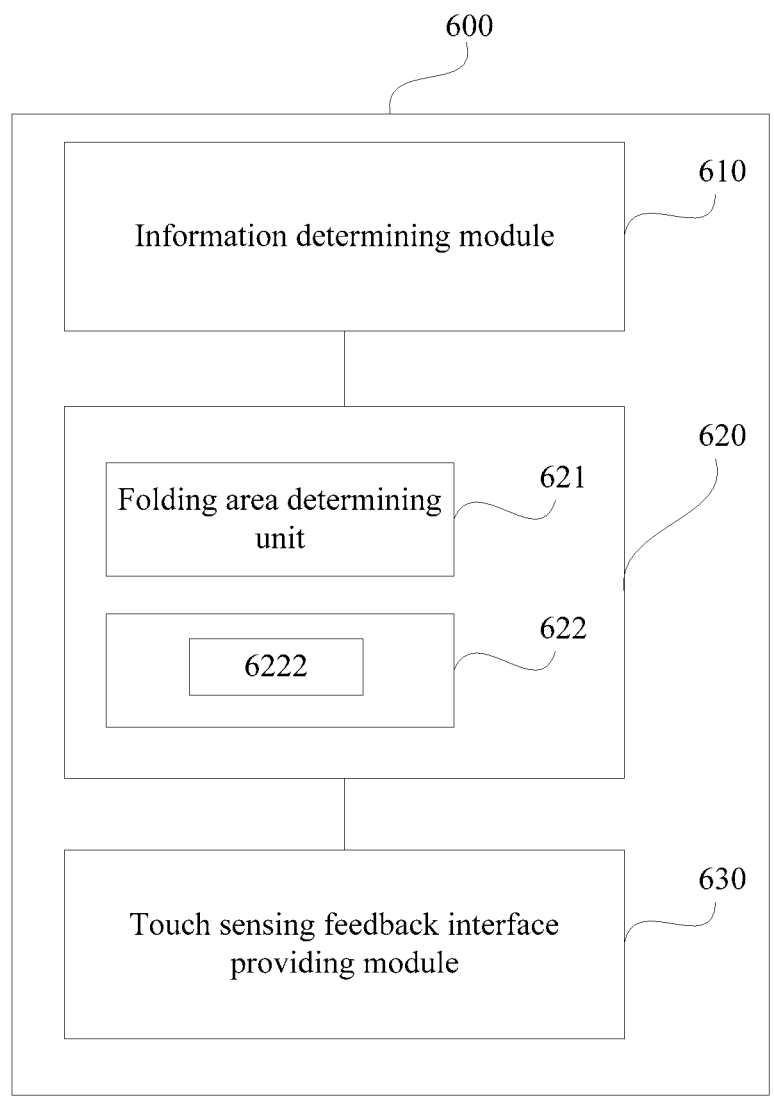

In some possible implementing manners, in addition to the foregoing the multiple folding areas, the multiple effective interaction areas may further comprise another area that is adjacent to or is connected to the multiple folding areas in the spatial position after the folding deformation occurs. Therefore, in this implementing manner, as shown in FIG. 7c, the area determining unit 622 comprises:

a second determining subunit 6222, configured to determine the multiple effective interaction areas at least according to the multiple folding areas and the first shape.

Figure 7D:
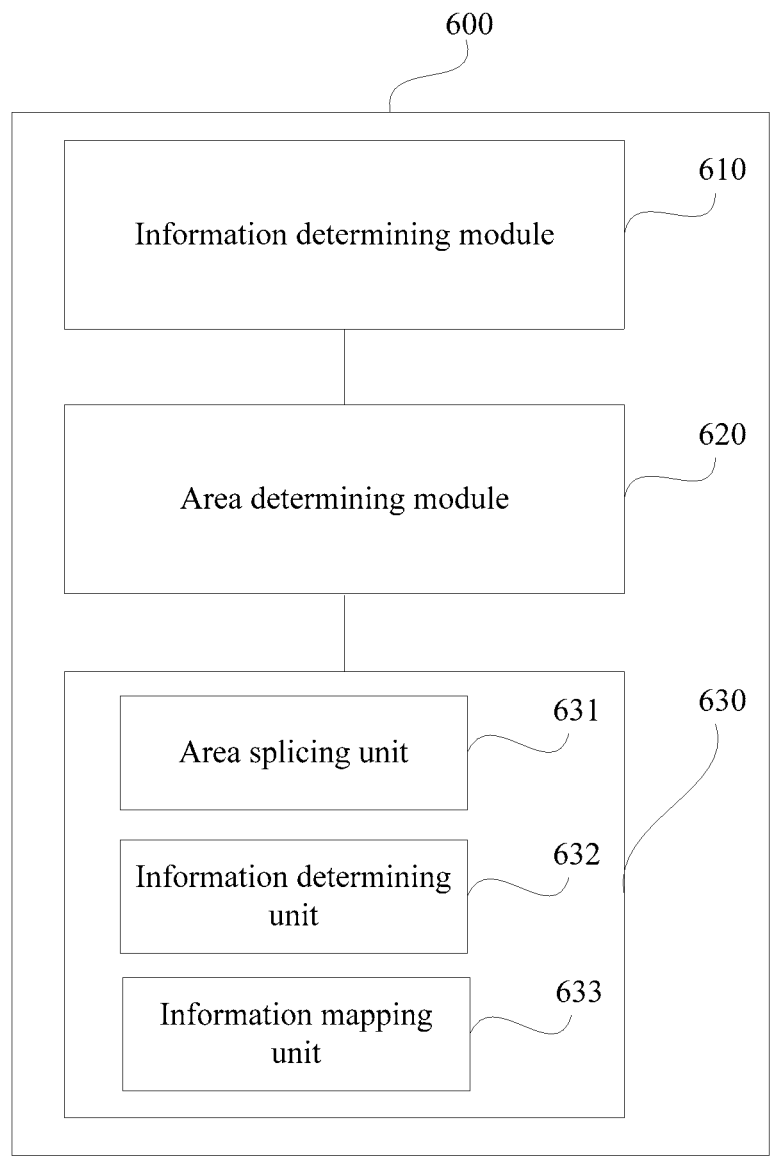

In a possible implementing manner, as shown in FIG. 7d, optionally, the touch sensing feedback interface providing module 630 may comprise:

an area splicing unit 631, configured to perform splicing on the multiple effective interaction areas according to the first relative position to form the interaction area. For a specific splicing manner, reference is made to the corresponding description in the foregoing method embodiments.

In a possible implementing manner, as shown in FIG. 7d, optionally, the touch sensing feedback interface providing module 630 may further comprise:

an information determining unit 632, configured to determine touch sensing feedback information matching the interaction area; and an information mapping unit 633, configured to map the touch sensing feedback information from the interaction area to the multiple effective interaction areas at least according to the first relative position.

In a possible implementing manner, the touch sensing feedback information matching the interaction area, for example, may be: touch sensing feedback information matching shape information of the interaction area.

Figure 7E:
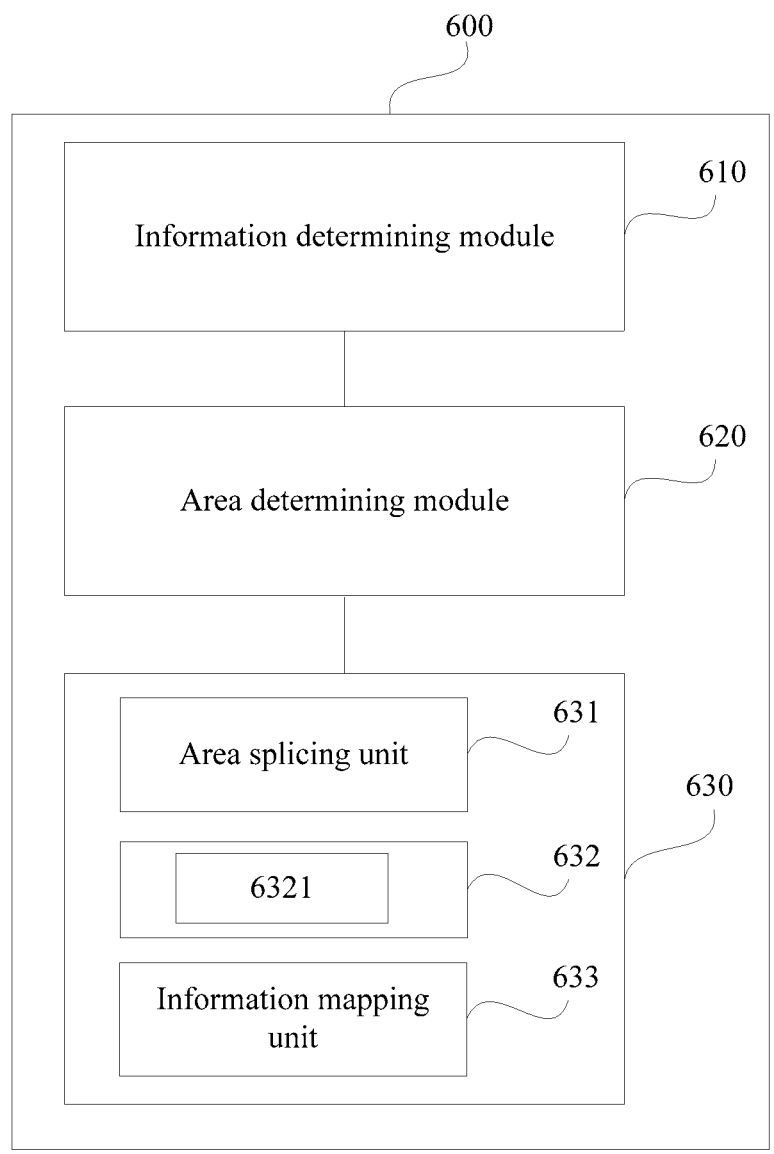

In another possible implementing manner, as shown in FIG. 7e, optionally, the information determining unit 632 comprises:

a first information determining subunit 6321, configured to: in response to that the interaction area corresponds to a display image, determine touch sensing feedback information at least matching the display image.

For matching between the display image and the touch sensing feedback information, reference is made to corresponding description in the method embodiment.

Figure 7F:
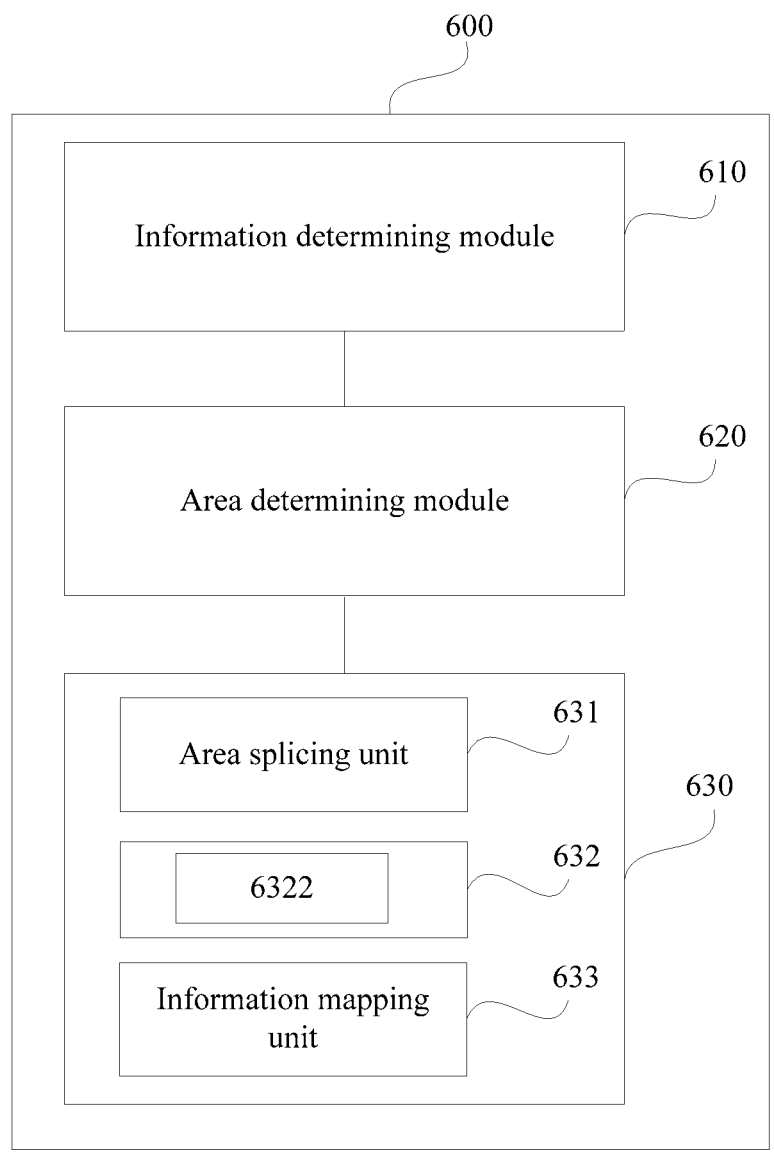

In still another possible implementing manner, as shown in FIG. 7f, optionally, the information determining unit 632 comprises:

a second information determining subunit 6322, configured to: in response to a touch operation at the interaction area, determine touch sensing feedback information at least matching the touch operation.

For matching between the touch operation and the touch sensing feedback information, reference is made to corresponding description in the method embodiment.

As discussed in the method embodiment, in a possible implementing manner, the information determining unit 632 may further determine touch sensing feedback information that matches the following several factors at the same time: a display image corresponding to the interaction area, a touch operation in the interaction area.

In a possible implementing manner, optionally, as shown in FIG. 7f, the information mapping unit 633 comprises:

a processing subunit 6331, configured to process the touch sensing feedback information according to the first relative position, to obtain multiple pieces of touch sensing feedback sub-information respectively corresponding to the multiple effective interaction areas.

Figure 7G:
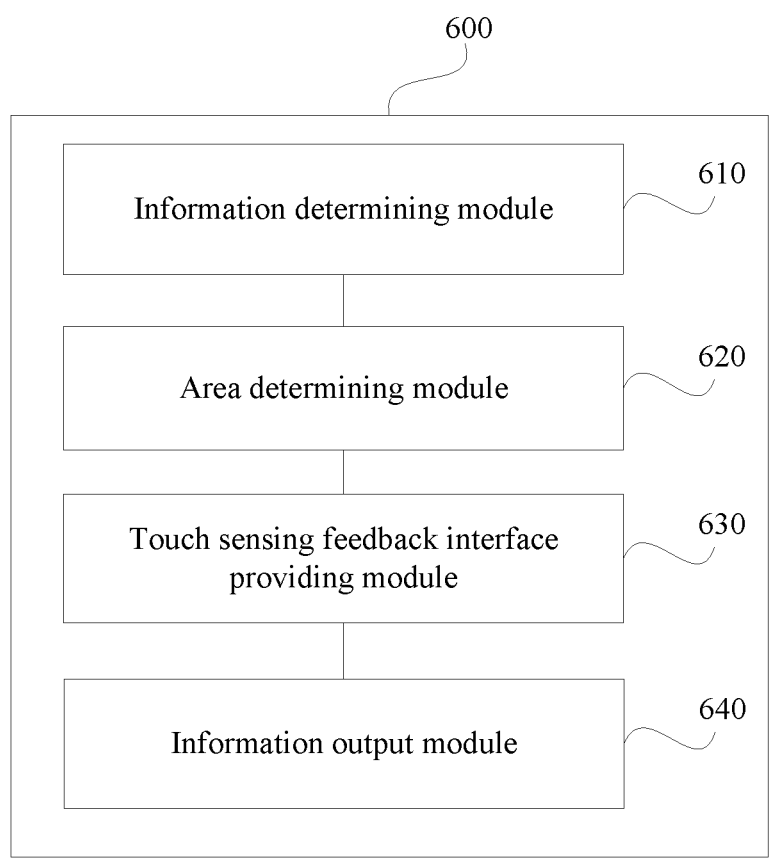

In a possible implementing manner, optionally, as shown in FIG. 7g, the apparatus 600 further comprises:

an information output module 640, configured to present the multiple touch sensing feedback sub-information respectively by using the multiple effective interaction areas.

For further description of functions of modules and units in this embodiment of the present application, reference may be made to the corresponding description in the foregoing method embodiments.

Figure 8:
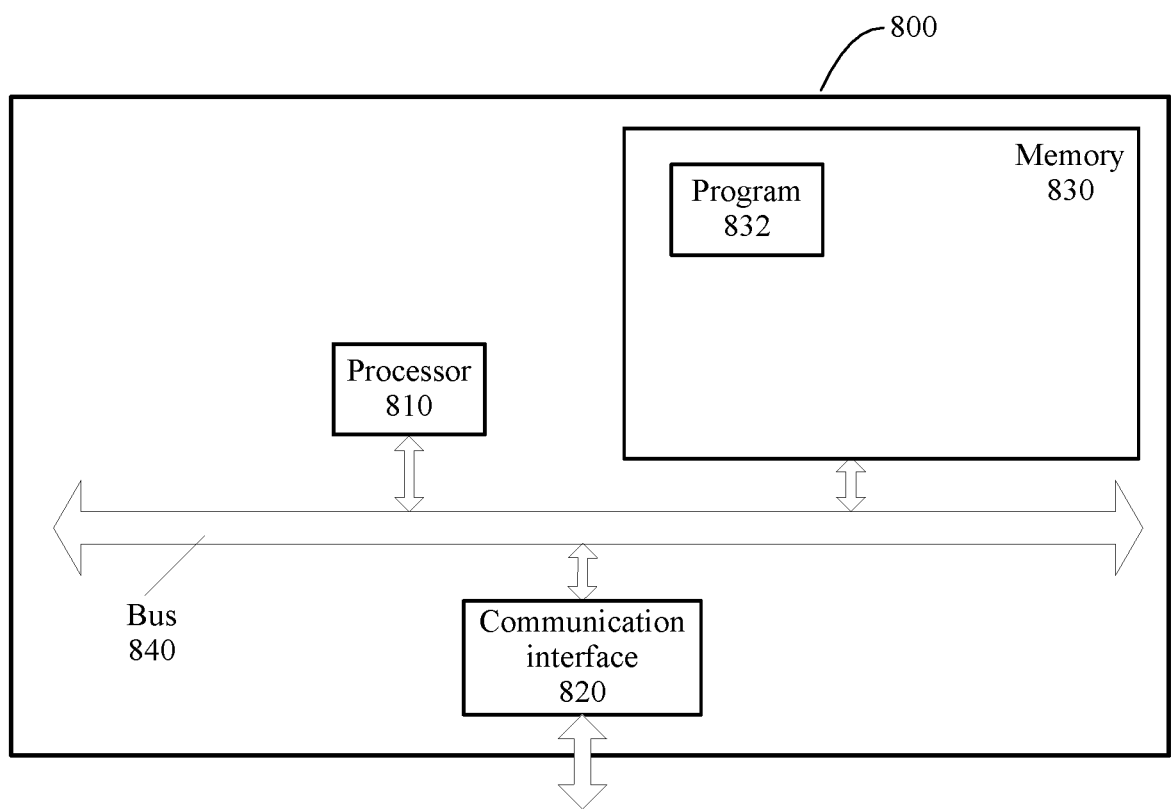
FIG. 8 is a schematic structural block diagram of user equipment according to an embodiment of the present application.

FIG. 8 is a schematic structural diagram of user equipment 800 according to an embodiment of the present application. In a specific embodiment of the present application, a specific implementation of the user equipment 800 is not limited. As shown in FIG. 8, the user equipment 800 may comprise:

a processor 810, a communication interface 820, a memory 830, and a communication bus 840.

The processor 810, the communication interface 820, and the memory 830 accomplish communication with each other by using the communication bus 840.

The communication interface 820 is configured to communicate with a network element such as a client.

The processor 810 is configured to execute a program 832, and specifically may execute related steps in the foregoing method embodiment.

Specifically, the program 832 may comprise program code, where the program code comprises a computer operation instruction.

The processor 810 may be a central processing unit (CPU), or an application specific integrated circuit (ASIC), or may be configured as one or more integrated circuits that implement this embodiment of the present application.

The memory 830 is configured to store the program 832. The memory 830 may comprise a high-speed RAM, or may further comprise a non-volatile memory, for example, at least one magnetic disk memory. The program 832 specifically may be configured to cause the user equipment 800 to execute the following operations:

determine shape related information of a deformable touch sensing feedback surface, where the shape related information corresponds to a first shape of the deformable touch sensing feedback surface after a folding deformation;

determine multiple effective interaction areas on the deformable touch sensing feedback surface at least according to the shape related information, where the multiple effective interaction areas meet the following conditions: in nonadjacent positions on the deformable touch sensing feedback surface, and adjacent in a spatial position in the first shape; and using the multiple effective interaction areas as one interaction area at least according to a first relative position of the multiple effective interaction areas in the spatial position in the first shape to provide a touch sensing feedback interface to at least one interaction object.

Reference may be made to corresponding description of corresponding steps and units in the foregoing embodiment for specific implementation of the steps in the program 832, which is no longer elaborated herein. A person skilled in the art may clearly understand that, for convenience and simplicity of description, reference may be made to corresponding process description in the foregoing method embodiment for a specific working process of devices and modules described above, which are no longer elaborated herein.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present invention.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or network equipment, etc.) to execute all or some steps of the method described in each embodiment of the present application. The foregoing storage medium comprises various media which can store a program code, such as a USB disk, a mobile hard disk, a read-only memory (ROM), a random-access memory (RAM), a magnetic disk or a compact disk.

The above implementations are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. An interaction method, comprising:
   determining shape related information of a deformable touch sensing feedback surface, wherein the shape related information corresponds to a first shape of the deformable touch sensing feedback surface after a folding deformation;
   determining multiple effective interaction areas on the deformable touch sensing feedback surface at least according to the shape related information, wherein the multiple effective interaction areas are areas where an effective interaction is performed with an interaction object and meet the following conditions: in nonadjacent positions on the deformable touch sensing feedback surface and adjacent in a spatial position in the first shape, wherein two effective interaction areas are deemed as adjacent in a spatial position if a distance between nearby edges of the two effective interaction areas is less than a set value and greater than zero, and the set value is determined so that a touch sensing feedback provided by the two effective interaction areas as one area is sensed by the at least one interaction object; and
   using the multiple effective interaction areas as one interaction area at least according to a first relative position of the multiple effective interaction areas in the spatial position in the first shape to provide a touch sensing feedback interface to at least one interaction object,
   wherein the deformable touch sensing feedback surface comprises a touch sensing feedback array, which provides at least one of touch sensing feedbacks comprising undulations, vibrations, texture, or temperature.

2. The method of claim 1, wherein the shape related information comprises:
   first shape information of the first shape.

3. The method of claim 1, wherein the shape related information comprises:
   second shape information of a second shape of the deformable touch sensing feedback surface before the folding deformation, and deformation information corresponding to the folding deformation.

4. The method of claim 1, wherein
   the shape related information is determined at least according to a deformation control instruction.

5. The method of claim 1, wherein
   the shape related information is determined at least according to deformation sensing information for the deformable touch sensing feedback surface.

6. The method of claim 1, wherein the determining multiple effective interaction areas at least according to the shape related information comprises:
   determining, according to the shape related information, multiple folding areas where multiple outwardly-bending end surfaces are located, wherein the multiple outwardly-bending end surfaces are adjacent in the spatial position on the deformable touch sensing feedback surface in the first shape; and
   determining the multiple effective interaction areas at least according to the multiple folding areas.

7. The method of claim 6, wherein the determining the multiple effective interaction areas at least according to the multiple folding areas comprises:
   determining that the multiple effective interaction areas are the multiple folding areas.

8. The method of claim 6, wherein the determining the multiple effective interaction areas at least according to the multiple folding areas comprises:
   determining the multiple effective interaction areas at least according to the multiple folding areas and the first shape.

9. The method of claim 1, wherein that the multiple effective interaction areas are adjacent in the spatial position comprises:
   for a first effective interaction area of the multiple effective interaction areas, at least another effective interaction area that is adjacent in the spatial position to the first effective interaction area exists,
   wherein the first effective interaction area is any effective interaction area of the multiple effective interaction areas.

10. The method of claim 1, wherein the using the multiple effective interaction areas as one interaction area at least according to a first relative position to provide a touch sensing feedback interface to at least one interaction object comprises:
    performing splicing on the multiple effective interaction areas according to the first relative position to form the interaction area.

11. The method of claim 1, wherein the using the multiple effective interaction areas as one interaction area to provide a touch sensing feedback interface to at least one interaction object comprises:

determining touch sensing feedback information matching the interaction area; and mapping the touch sensing feedback information from the interaction area to the multiple effective interaction areas at least according to the first relative position.

12. The method of claim 11, wherein the determining touch sensing feedback information matching the interaction area comprises:

in response to that the interaction area corresponds to a display image, determining touch sensing feedback information at least matching the display image.

13. The method of claim 11, wherein the determining touch sensing feedback information matching the interaction area comprises:

in response to a touch operation at the interaction area, determining touch sensing feedback information at least matching the touch operation.

14. The method of claim 11, wherein the mapping the touch sensing feedback information from the interaction area to the multiple effective interaction areas according to the first relative position comprises:

processing the touch sensing feedback information according to the first relative position, to obtain multiple pieces of touch sensing feedback sub-information respectively corresponding to the multiple effective interaction areas.

15. The method of claim 14, wherein the using the multiple effective interaction areas as one interaction area to provide a touch sensing feedback interface to at least one interaction object further comprises:

presenting the multiple touch sensing feedback sub-information respectively by using the multiple effective interaction areas.

16. An interaction apparatus, comprising:

an information determining module, configured to determine shape related information of a deformable touch sensing feedback surface, wherein the shape related information corresponds to a first shape of the deformable touch sensing feedback surface after a folding deformation;

an area determining module, configured to determine multiple effective interaction areas on the deformable touch sensing feedback surface at least according to the shape related information, wherein the multiple effective interaction areas are areas where an effective interaction is performed with an interaction object and meet the following conditions: in nonadjacent positions on the deformable touch sensing feedback surface and adjacent in a spatial position in the first shape, wherein two effective interaction areas are deemed as adjacent in a spatial position if a distance between nearby edges of the two effective interaction areas is less than a set value and greater than zero, and the set value is determined so that a touch sensing feedback provided by the two effective interaction areas as one area is sensed by the at least one interaction object; and a touch sensing feedback interface providing module, configured to use the multiple effective interaction areas as one interaction area at least according to a first relative position of the multiple effective interaction areas in the spatial position in the first shape to provide a touch sensing feedback interface to at least one interaction object, wherein the deformable touch sensing feedback surface comprises a touch sensing feedback array, which provides at least one of touch sensing feedbacks comprising undulations, vibrations, texture, or temperature.

17. The apparatus of claim 16, wherein the shape related information comprises:

first shape information of the first shape.

18. The apparatus of claim 16, wherein the shape related information comprises:

second shape information of a second shape of the deformable touch sensing feedback surface before the folding deformation, and deformation information corresponding to the folding deformation.

19. The apparatus of claim 16, wherein the information determining module comprises:

a first information determining unit, configured to determine the shape related information at least according to a deformation control instruction.

20. The apparatus of claim 16, wherein the information determining module comprises:

a second information determining unit, configured to determine the shape related information at least according to deformation sensing information for the deformable touch sensing feedback surface.

21. The apparatus of claim 16, wherein the area determining module comprises:

a folding area determining unit, configured to determine, according to the shape related information, multiple folding areas where multiple outwardly-bending end surfaces are located, wherein the multiple outwardly-bending end surfaces are adjacent in the spatial position on the deformable touch sensing feedback surface in the first shape; and an area determining unit, configured to determine the multiple effective interaction areas at least according to the multiple folding areas.

22. The apparatus of claim 21, wherein the area determining unit comprises:

a first determining subunit, configured to determine that the multiple folding areas are the multiple effective interaction areas.

23. The apparatus of claim 21, wherein the area determining unit comprises:

a second determining subunit, configured to determine the multiple effective interaction areas at least according to the multiple folding areas and the first shape.

24. The apparatus of claim 16, wherein that the multiple effective interaction areas are adjacent in the spatial position comprises:

for a first effective interaction area of the multiple effective interaction areas, at least another effective interaction area that is adjacent in the spatial position to the first effective interaction area exists, wherein the first effective interaction area is any effective interaction area of the multiple effective interaction areas.

25. The apparatus of claim 16, wherein the touch sensing feedback interface providing module comprises:

an area splicing unit, configured to perform splicing on the multiple effective interaction areas according to the first relative position to form the interaction area.

26. The apparatus of claim 16, wherein the touch sensing feedback interface providing module comprises:
- an information determining unit, configured to determine touch sensing feedback information matching the interaction area; and
- an information mapping unit, configured to map the touch sensing feedback information from the interaction area to the multiple effective interaction areas at least according to the first relative position.

27. The apparatus of claim 26, wherein the information determining unit comprises:
- a first information determining subunit, configured to: in response to that the interaction area corresponds to a display image, determine touch sensing feedback information at least matching the display image.

28. The apparatus of claim 26, wherein the information determining unit comprises:
- a second information determining subunit, configured to: in response to a touch operation at the interaction area, determine touch sensing feedback information at least matching the touch operation.

29. The apparatus of claim 26, wherein the information mapping unit comprises:
- a processing subunit, configured to process the touch sensing feedback information according to the first relative position, to obtain multiple pieces of touch sensing feedback sub-information respectively corresponding to the multiple effective interaction areas.

30. The apparatus of claim 29, wherein the apparatus further comprises:
- an information output module, configured to present the multiple touch sensing feedback sub-information respectively by using the multiple effective interaction areas.

31. User equipment, wherein the user equipment comprises:
- a memory, configured to store a program; and
- a processor, configured to execute the program stored in the memory, the program causes the processor to execute the following operations:
- determining shape related information of a deformable touch sensing feedback surface, wherein the shape related information corresponds to a first shape of the deformable touch sensing feedback surface after a folding deformation;
- determining multiple effective interaction areas on the deformable touch sensing feedback surface at least according to the shape related information, wherein the multiple effective interaction areas are areas where an effective interaction is performed with an interaction object and meet the following conditions: in nonadjacent positions on the deformable touch sensing feedback surface and adjacent in a spatial position in the first shape, wherein two effective interaction areas are deemed as adjacent in a spatial position if a distance between nearby edges of the two effective interaction areas is less than a set value and greater than zero, and the set value is determined so that a touch sensing feedback provided by the two effective interaction areas as one area is sensed by the at least one interaction object; and
- using the multiple effective interaction areas as one interaction area at least according to a first relative position of the multiple effective interaction areas in the spatial position in the first shape to provide a touch sensing feedback interface to at least one interaction object,
- wherein the deformable touch sensing feedback surface comprises a touch sensing feedback array, which provides at least one of touch sensing feedbacks comprising undulations, vibrations, texture, or temperature.

* * * * *